United States Patent
Kuribayashi et al.

[11] Patent Number: 5,988,311
[45] Date of Patent: Nov. 23, 1999

[54] ELECTRIC STEERING ACTUATOR

[75] Inventors: Takashi Kuribayashi; Kazuhiro Kishimoto; Hirokazu Kitazawa; Yoshitaka Katashima; Yoshio Kakizaki; Hitoshi Suda, all of Saitama-ken, Japan

[73] Assignee: Honda Giken Kogyo Kabushiki Kaisha, Tokyo, Japan

[21] Appl. No.: 08/641,373

[22] Filed: Apr. 30, 1996

[30] Foreign Application Priority Data

May 1, 1995 [JP] Japan .................................. 7-131005

[51] Int. Cl.$^6$ ................................ B62D 5/04; B62D 7/14
[52] U.S. Cl. ............................................................ 180/444
[58] Field of Search ........................... 180/445, 443–444, 180/411–413, 429, 434

[56] References Cited

U.S. PATENT DOCUMENTS

| | | | |
|---|---|---|---|
| 4,773,494 | 9/1988 | Carlson et al. | 180/444 |
| 4,811,813 | 3/1989 | Hovanchak | 180/444 |
| 5,083,626 | 1/1992 | Abe et al. | 180/445 |
| 5,086,861 | 2/1992 | Peterson | 180/445 |
| 5,135,067 | 8/1992 | Kohata et al. | 180/445 |
| 5,330,023 | 7/1994 | Miyashita et al. . | |
| 5,590,732 | 1/1997 | Sugino et al. | 180/444 |
| 5,595,089 | 1/1997 | Watanabe et al. | 180/445 |
| 5,685,390 | 11/1997 | Chikuma et al. | 180/444 |

*Primary Examiner*—Karen M. Young
*Assistant Examiner*—Raymond B. Johnson
*Attorney, Agent, or Firm*—Carrier, Blackman & Associates, P.C.; Joseph P. Carrier; William D. Blackman

[57] ABSTRACT

In an electric steering actuator comprising an electric motor having a hollow output shaft, a steering shaft passed through the hollow center of the output shaft of the electric motor, and a ball-screw mechanism provided between the output shaft and the steering shaft for converting the rotary movement of the output shaft into a longitudinal movement of the steering shaft. The ball-screw mechanism comprises a threaded section of the steering shaft, and a nut member which threadably engages with the threaded section of the steering shaft via steel balls, and is secured to the output shaft of the electric motor via a serration coupling or the like which achieves an axially free but rotatively fast coupling between the two parts. Thus, the overall axial dimension of the actuator can be reduced, and the step of joining these two parts is significantly simplified in terms of both effort and time while the number of component parts is also reduced. In particular, by installing the ball-screw mechanism in the first casing section in an axially immobile manner, removal of the rotor or the motor assembly is substantially simplified, thereby making the actuator easier to manufacture and service. Also, the motor can be interchanged without affecting the ball-screw mechanism.

17 Claims, 2 Drawing Sheets

ELECTRIC STEERING ACTUATOR

TECHNICAL FIELD

The present invention relates to an electric steering actuator for use in an electric power steering system.

BACKGROUND OF THE INVENTION

In some applications, in particular the steering systems for the rear wheels of a four-wheel steering vehicle, electric steering actuators are favored because of their desirable power characteristics and compact and light-weight design. For instance, the electric steering actuator disclosed in U.S. Pat. No. 5,330,023 comprises an electric motor having a hollow output shaft, a steering shaft passed through the hollow center of the output shaft of the electric motor, and a ball-screw mechanism provided between the output shaft and the steering shaft for converting the rotary movement of the output shaft into a longitudinal movement of the steering shaft. The ball-screw mechanism comprises a threaded section of the steering shaft, and a nut member which threadably engages with the threaded section of the steering shaft via steel balls, and is secured to the output shaft of the electric motor via a flange coupling.

According to this previous proposal, because threaded bolts have to be passed through a first flange, and threaded into holes provided in a second flange, the axial length of this coupling structure tends to be significant. Furthermore, because the rotor of the motor must be joined to the nut member before the entire assembly is placed in a casing, a substantial amount of work is required for the assembling process. Also, some difficulty is involved in servicing the actuator, and this adds to the cost for the maintenance.

BRIEF SUMMARY OF THE INVENTION

In view of such problems of the prior art, a primary object of the present invention is to provide an electric steering actuator which is suitable for compact design, and, in particular, which allows its axial length to be reduced.

A second object of the present invention is to provide an electric steering actuator which is easy to assemble and service.

A third object of the present invention is to provide an electric steering actuator which is economical to manufacture and use.

A fourth object of the present invention is to provide an electric steering actuator which is free from knocking noises and durable in use.

According to the present invention, these and other objects can be accomplished by providing an electric steering actuator, comprising: an axially elongated casing including a first casing section and a second casing section which are joined at mutually opposing axial ends thereof; an electric motor including a stator received in the second casing section, and a rotor including a hollow rotor shaft having a first end rotatably supported by a bearing disposed in the second casing section, and a second end located adjacent the opposing axial end of the second casing section; a steering shaft passed inside the hollow rotor shaft and having two ends projecting from axial ends of the first and second casing sections remote from the mutually opposing axial ends thereof, and an intermediate threaded section disposed inside the first casing section and adjacent the second end of the rotor shaft; a nut member threadably engaged with the threaded section of the steering shaft; and coupling means provided between the nut member and the second end of the rotor shaft for an axially free but rotatively fast coupling between the nut member and the second end of the rotor shaft. Typically, the axially free but rotatively fast coupling consists of a spline or serration coupling.

Because the opposing ends of the nut member and the rotor shaft are not required to be provided with any flanges and threaded bores for joining them, the overall axial dimension of the actuator can be reduced. Furthermore, the step of joining these two parts is significantly simplified in terms of both effort and time, and the number of component parts is also reduced. In particular, by installing the ball-screw mechanism in the first casing section in an axially immobile manner, removal of the rotor or the motor assembly is substantially simplified, thereby making the actuator easier to manufacture and service. Also, the motor can be interchanged without affecting the ball-screw mechanism.

When the electric motor comprises a brush unit disposed in the first casing section, the second casing section may consist of a highly simple structure which may at least be mostly made of stamped sheet metal, in a similar manner as a normal electric motor, thereby reducing the manufacturing cost.

When one of the axially opposing ends of the first and second casing sections is provided with an annular projection which snugly fits into the other of the opposing ends, the two casing sections can be aligned with a required precision without any effort. When the axially free but rotatively fast coupling includes spring means which urges the rotor shaft and the nut member axially away from each other, the axial play of the rotor shaft and other parts can be removed whereby the actuator can operate quietly and the durability of the actuator is improved.

The above and further objects, advantages and salient features of the invention will be apparent from the following detailed description which, when considered in light of the annexed drawings, discloses a presently preferred embodiment of the invention.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
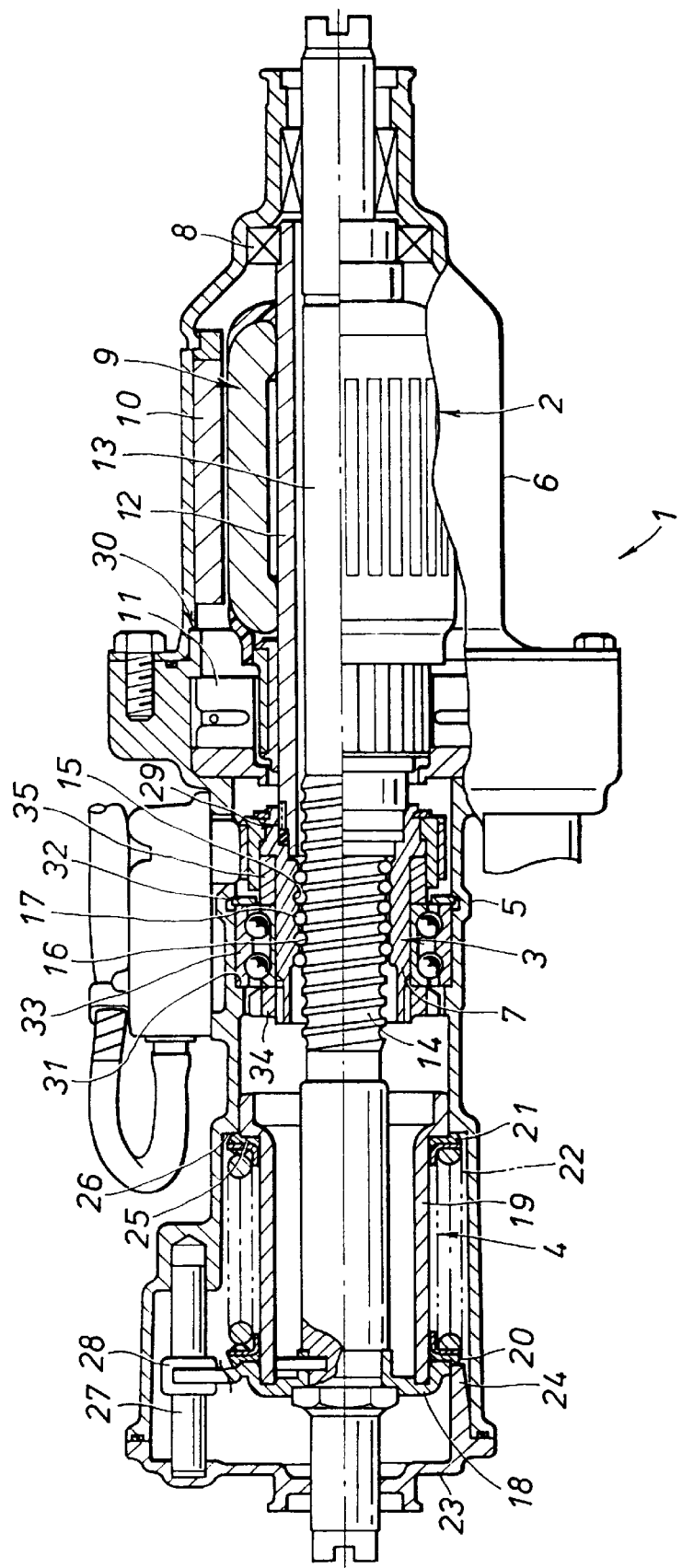
FIG. 1 is a longitudinal sectional view of a preferred embodiment of the electric steering actuator according to the present invention.

FIG. 1 shows an electric actuator constructed as an actuator for a power steering system, in particular for steering rear wheels in a four wheel steering vehicle, according to the present invention. This electric actuator 1 comprises a DC electric motor unit 2, a ball-screw unit 3, and a centering unit 4 for urging the actuator to a neutral position. The actuator 1 is received in a casing consisting of a first casing section 5 and a second casing section 6 which are joined with each other at axially mutually opposing ends thereof.

The DC electric motor unit 2 comprises a rotor 9, and a stator 10. The stator 10 consists of permanent magnet pieces securely attached to the inner circumferential surface of the second casing section 6. The rotor is provided with a hollow central shaft or a rotor shaft 12 having one end rotatably supported by the first casing section 5 via a nut member 7 of the ball-screw unit 3 and the other end rotatably supported by a bearing 8 secured to the second casing section 6. Thus, the rotor 9 is adapted to directly turn the nut member 7 in either direction by electric power supplied to the windings of the rotor 9 via a brush 11 supported by the first casing 5. The hollow central bore of the rotor shaft 12 coaxially receives a steering shaft 13 therein. The two ends of the steering shaft 13 project from respective axial ends of the casing, and are connected to associated tie rods (not shown in the drawings) via ball joints.

The ball-screw unit 3 comprises the nut member 7 which is provided with a threaded bore disposed coaxially with the inner bore of the rotor shaft 12, an external thread 14 provided in an intermediate part of the steering shaft 13, and steel balls 17 which are interposed between the threaded bore of the nut member 7 and the external thread 14 of the steering shaft 13. The steel balls 17 are received in screw grooves 15 and 16 of the internal thread and the external thread, respectively, each having a semicircular cross section.

The centering unit 7 comprises a disk 18 securely attached to an end of the steering shaft 13 remote from the electric motor, a sleeve 19 having one end securely attached to a peripheral part of the disk 18 and extending coaxially toward the ball-screw unit 3, and a compression coil spring 22 received in an annular space defined between the outer circumferential surface of the sleeve 19 and the inner circumferential surface of the first casing section 5. One end of the compression coil spring 22 abuts an axial projection 24 provided in an end cap 23 closing an open end of the first casing section 5 remote from the electric motor, and an outer periphery of the disk 18, via a first annular spring retainer 20. The other end of the compression coil spring 22 abuts an annular shoulder 25 defined in the outer circumferential surface of the free end of the sleeve 19 and an annular shoulder 26 defined in the inner circumferential surface of the first casing section 5 via a second annular spring retainer 21.

The steering shaft 13 is prevented from rotating around its axial line by a pin 27 secured to the first casing section 5 and the end cap 23 and extending in parallel with the steering shaft 13, and a cooperating fork member 28 which extends radially from the disk 18, and is engaged by the pin 27. Thereby, the steering shaft 13 is only allowed to move axially relative to the casing as the nut member 7 of the ball-screw unit 3 turns.

Thus, the rotation of the rotor 9 is converted into the longitudinal movement of the steering shaft 13 which in turn causes the rear wheels to be steered via tie rods not shown in the drawings.

When the steering shaft 13 moves leftward from the neutral position given in FIG. 1, the sleeve 19 along with the disk 18 fixedly secured to the steering shaft 13 moves leftward. As a result, the compression coil spring 22 is compressed between the annular shoulder 25 of the sleeve 19 and the axial projection 24 of the end cap 23, thereby urging the steering shaft 13 to its neutral position. Conversely, when the steering shaft 13 moves rightward from the neutral position given in FIG. 1, the compression coil spring 22 is compressed between the annular shoulder 26 of the first casing section 5 and the outer periphery of the disk 18, again thereby urging the steering shaft 13 to its neutral position. Thus, a fail-safe feature is achieved so that the steering shaft is urged to its neutral position in case the engine has stopped or the drive power to the electric motor is stopped.

Figure 2:
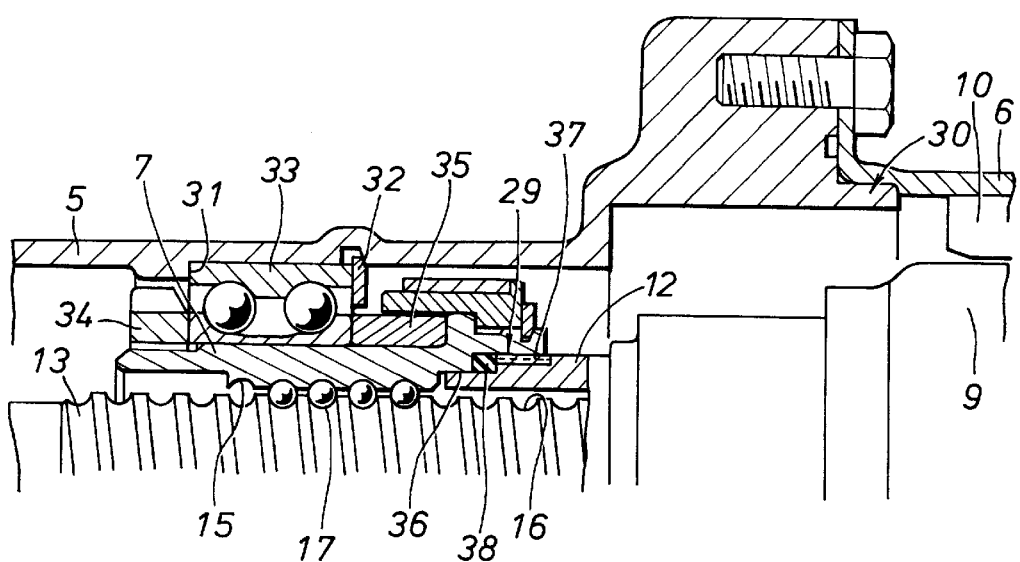
FIG. 2 is an enlarged view of a part of FIG. 1.

Opposing ends of the nut member 7 and the rotor shaft 12 are engaged with each other by a coupling assembly 29 consisting of a serration coupling 37 in this preferred embodiment as best shown in FIG. 2. This coupling assembly 29 allows an axial fitting connection between the two parts, but joins the two parts in a torque transmitting relationship. The spline or serratoin coupling 37 which permits the shaft 12 and ball nut 7 to be axially fitted together and prevents these components from rotating relative to each other once fitted together constitutes an axially free but rotatively fast coupling. The opposing ends of the first casing section 5 and the second casing section 6 are provided flanges, and are secured to each other by threaded bolts passed through holes provided in one of the flanges and threaded into holes provided in the other flange. In particular, the first casing section 5 is provided with an annular projection 30 which snugly fits into the inner bore of the opposing end of the second casing section 6. The annular projection 30 ensures a proper alignment between the two casing sections 5 and 6.

An angular ball bearing 33 is fitted into the inner bore of the first casing section 5, and is kept immobile in the axial direction by means of an annular shoulder 31 provided in the inner circumferential surface of the first casing section 5 and a stop ring 32. The nut member 7 is received in the inner bore of the inner race of the angular ball bearing 33, and the inner race of the bearing 33 is clamped between a collar 35 integral with the nut member 7 and a bearing nut 34 threadably engaged by the nut member 7 to keep the nut member 7 immobile in the axial direction. Therefore, the nut member 7 is supported so as to be immobile in the axial direction relative to the first casing section 5, but to be freely rotatable relative to the first casing section 5.

When assembling this actuator, first of all, the rotor 9 and the stator 10 are assembled into the second casing section 6 while all the remaining component parts are assembled into the first casing section 5. Then, with an end of the rotor shaft 12 aligned with the open end of the nut member 7, the first and second casing sections 5 and 6 are axially joined with each other, and are secured with each other by threaded bolts passed through the flanges of these two casing sections. The axial position of the rotor shaft 12 is fixed at the other axial end thereof by the bearing 8 provided in the second casing section 6, and the nut member 7 and the rotor shaft 12 are axially coupled with each other by the serration coupling 37 so as to be joined rotationally fast with each other.

Because a resilient member 38, consisting of an O-ring or a wave washer, is inserted between axially opposing ends of the nut member 7 and the rotor shaft 12, some axial movement between them is accommodated to a certain extent without producing any play which could cause noises. In particular, because the resilient member 38 normally urges the nut member 7 and the rotor shaft 12 away from each other, any play that might exist between them can be removed, and the steering actuator can be operate without producing any knocking noises. This is obviously desirable in improving the durability of the steering actuator.

Thus, according to the present invention, flanges or threaded bolts are not required for joining the nut member and the output end of the electric motor, the overall axial length of the steering actuator can be reduced, the amount of work involved in the assembly process is reduced, and the material cost is also reduced. Furthermore, it is possible to replace the electric motor without affecting the ball-screw mechanism, and the servicing of the electric steering actuator can be made easier. Also, it is possible to use a common ball-screw mechanism for different vehicle models only by changing the capacity of the motor which is incorporated in the electric actuator. This is advantageous in reducing the manufacturing cost of the electric actuator. Additionally, a relatively flexible coupling between the electric motor and the ball-screw mechanism ensures a satisfactory operation of the actuator without requiring any high precision in the alignment between the ball screw mechanism and the electric motor, and such feature achieves an improvement in the durability of the actuator in use. Also, the use of a resilient member between the ball screw mechanism and the output shaft of the electric motor contributes to the elimination of play between them.

Although the present invention has been described in terms of a preferred embodiment thereof, it is obvious to a person skilled in the art that various alterations and modifications are possible without departing from the scope of the present invention which is set forth in the appended claims.

What we claim is:

1. An electric steering actuator, comprising:
   an axially elongated casing including a first casing section and a second casing section which are joined at mutually opposing axial ends thereof;
   a bearing disposed in said second casing section;
   an electric motor including a stator received in said second casing section, and a rotor including a hollow rotor shaft having a first end rotatably supported by said bearing disposed in said second casing section, and a second end located adjacent to said opposing axial end of said second casing section;
   a steering shaft passed inside said hollow rotor shaft and having two ends projecting from axial ends of said first and second casing sections remote from said mutually opposing axial ends thereof, and an intermediate threaded section disposed inside said first casing section and adjacent said second end of said rotor shaft;
   a nut member threadably engaged with said threaded section of said steering shaft; and
   coupling means provided between said nut member and said second end of said rotor shaft for an axially free but rotatively fast coupling between said nut member and said second end of said rotor shaft;
   one of said mutually opposing axial ends of said first and second casing sections being provided with an annular projection which fits into the other of said opposing ends in a manner so as to ensure proper alignment therewith.

2. An electric steering actuator according to claim 1, wherein said electric motor comprises a brush unit disposed in said first casing section.

3. An electric steering actuator according to claim 1, wherein said axially free but rotatively fast coupling means includes resilient means which urges said rotor shaft and said nut member axially away from each other.

4. An electric steering actuator according to claim 1, wherein said axially free but rotatively fast coupling means comprises one of a spline coupling and a serration coupling.

5. An electric steering actuator according to claim 1, further including fail safe centering means operatively associated with one said end of said steering shaft in said first casing section for normally urging said steering shaft toward a neutral position thereof.

6. An electric steering actuator according to claim 1, wherein said nut member and said intermediate threaded section of said steering shaft are components of a ball-screw mechanism, said ball-screw mechanism further including a plurality of balls disposed between said nut member and said threaded section of the steering shaft.

7. An electric steering actuator according to claim 1, wherein the other of said mutually opposing axial ends of said first and second casing sections has an inner bore defined therein for receiving said annular projection.

8. An electric steering actuator, comprising:
   an axially elongated casing, including a first casing section and a second casing section which are joined at mutually opposing axial ends thereof;
   a bearing disposed in said second casing section;
   an electric motor including a stator received in said second casing section and a rotor including a hollow rotor shaft having a first end thereof rotatively supported by said bearing disposed in said second casing section and a second end thereof projecting from said opposing axial end of said second casing section into said opposing axial end of said first casing section;
   a steering shaft passed inside said hollow rotor shaft and having opposite ends projecting from axial ends of said first and second casing sections remote from said mutually opposing axial ends thereof;
   ball-screw means disposed within said first casing section for operatively connecting said hollow rotor shaft to said steering shaft, said ball-screw means including an intermediate threaded section of said steering shaft and a nut member threadably engaged with said threaded section of said steering shaft; and
   coupling means provided between said nut member and said second end of said rotor shaft for coupling said nut member to said second end of said rotor shaft in an axially free but rotatively fast manner;
   one of said axially opposing ends of said first and second casing sections being provided with an annular projection which fits to the other of said axially opposing ends for alignment thereof.

9. An actuator according to claim 8, wherein
   said coupling means comprises one of a spline coupling and a serration coupling.

10. An actuator according to claim 9, wherein
    said coupling means further includes resilient means which urges said rotor shaft and said nut member axially away from each other.

11. An electric steering actuator according to claim 8, wherein said coupling means includes resilient means for urging said rotor shaft and said nut member axially away from each other.

12. An electric steering actuator according to claim 8, wherein said electric motor means comprises a brush unit disposed in said first casing section.

13. An electric steering actuator according to claim 8, wherein said ball-screw means, exclusive of the intermediate threaded section of said steering shaft, is disposed in said first casing section in a substantially axially immobile manner.

14. An actuator according to claim 8, wherein:
    said ball-screw means further includes a plurality of balls disposed between said intermediate threaded section of said steering shaft and said nut member.

15. An actuator according to claim 8, wherein the other of said axially opposing ends of said first and second casing sections has an inner bore defined therein for receiving said annular projection.

16. An electric steering actuator according to claim 8, further comprising means for holding said nut member of said ball-screw means axially immobile while permitting rotatable movement thereof relative to said casing.

17. An electric steering actuator, comprising:

an axially elongated casing, including a first casing section and a second casing section disposed in aligned abutting relation to said first casing section, said first and second casing sections contacting one another at mutually opposing inner ends thereof;

a bearing disposed in said second casing section;

an electric motor including a stator received in said second casing section, and a rotor including a hollow rotor shaft, said hollow rotor shaft having a first end rotatably supported by said bearing in said second casing section, and a second end located adjacent to said inner end of said second casing section;

a steering shaft extending through said hollow rotor shaft and having two ends projecting from opposite outer ends of said casing, and an intermediate threaded section disposed inside said first casing section and adjacent said second end of said rotor shaft;

a nut member threadably engaged with said threaded section of said steering shaft, said nut member and said second end of said rotor shaft being operatively connected so as to allow axial movement of said nut member along said rotor shaft, while preventing rotation of said nut member with respect thereto;

one of said inner ends of said first and second casing sections being provided with an annular projection which fits engagingly into the other of said inner ends so as to align said first and second casing sections.

* * * * *

UNITED STATES PATENT AND TRADEMARK OFFICE
CERTIFICATE OF CORRECTION

PATENT NO : 5,988,311

DATED : 23 November 1999

INVENTOR(S): T. Kuribayashi, K. Kishimoto, H. Kitazawa, Y. Katashima, Y. Kakizaki, H. Suda It is certified that error appears in the above-identified patent and that said Letters Patent is hereby corrected as shown below:

On the cover page, under "[56] References Cited", for the first reference cited, please change "4,773,494" to --4,773,497--.

Column 3, 20th line, change "unit 7" to --unit 4--.

Column 4, line 5, change "serratoin" to --serration--.

Signed and Sealed this

Twenty-third Day of May, 2000

Attest:

Attesting Officer

Q. TODD DICKINSON

Director of Patents and Trademarks